US009025156B2

(12) United States Patent
Hirao

(10) Patent No.: US 9,025,156 B2
(45) Date of Patent: May 5, 2015

(54) INTERFEROMETER AND FOURIER SPECTROMETER USING SAME

(75) Inventor: Yusuke Hirao, Takatsuki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 313 days.

(21) Appl. No.: 13/515,250

(22) PCT Filed: Dec. 8, 2010

(86) PCT No.: PCT/JP2010/071983
§ 371 (c)(1), (2), (4) Date: Jun. 11, 2012

(87) PCT Pub. No.: WO2011/074452
PCT Pub. Date: Jun. 23, 2011

(65) Prior Publication Data
US 2012/0287439 A1    Nov. 15, 2012

(30) Foreign Application Priority Data

Dec. 14, 2009   (JP) ................... 2009-282586

(51) Int. Cl.
*G01B 9/02* (2006.01)
*G01J 3/453* (2006.01)
*G01J 3/02* (2006.01)

(52) U.S. Cl.
CPC ............. *G01J 3/4535* (2013.01); *G01J 3/02* (2013.01); *G01J 3/0208* (2013.01); *G01J 3/021* (2013.01); *G01J 3/027* (2013.01)

(58) Field of Classification Search
USPC ......................................................... 356/451
See application file for complete search history.

(56) References Cited

U.S. PATENT DOCUMENTS

| 4,732,482 A * | 3/1988 | Rippel ........................ 356/451 |
| 7,317,739 B2 * | 1/2008 | Chou et al. ...................... 372/18 |
| 7,889,348 B2 * | 2/2011 | Tearney et al. ................ 356/451 |
| 2010/0018289 A1* | 1/2010 | Oda ............................ 73/25.05 |
| 2010/0128280 A1* | 5/2010 | Davidson et al. ............. 356/497 |

FOREIGN PATENT DOCUMENTS

| JP | 63-203917 | 8/1988 |
| JP | 02-027225 | 1/1990 |
| JP | 02-238334 | 9/1990 |
| JP | 05-231939 | 9/1993 |
| JP | 07-243943 | 9/1995 |
| JP | 08-075434 | 3/1996 |
| JP | 09-026358 | 1/1997 |
| JP | 2004-220008 | 8/2004 |

* cited by examiner

*Primary Examiner* — Jonathan Hansen
*Assistant Examiner* — Jonathon Cook
(74) *Attorney, Agent, or Firm* — Cozen O'Connor

(57) ABSTRACT

Provided is a small, highly accurate Fourier spectrometer which enables highly accurate detection of an optical path difference in an interferometer. An element for changing to a narrow band is provided to return reflected light to a second light source (4), and the wavelength of light emitted by the second light source is locked, whereby the position of a movable mirror (8) is measured highly accurately and an optical path length (1) and an optical path length (2) match highly accurately.

8 Claims, 4 Drawing Sheets

INTERFEROMETER AND FOURIER SPECTROMETER USING SAME

RELATED APPLICATIONS

This is a U.S. National Phase Application under 35 USC 371 of International Application PCT/JP2010/071983 filed on Dec. 8, 2010.

This application claims the priority of Japanese Application No. 2009-282586 filed Dec. 14, 2009, the entire content of which is incorporated herein by reference.

TECHNICAL FIELD

The present invention relates to Fourier spectrometers for performing the Fourier transform spectrum analysis.

BACKGROUND ART

There is a known analyzing method called a Fourier transform spectrum analysis (see Patent Document 1, for example). The Michelson interferometer is known as an optical system related to the Fourier transform spectrum analysis.

In an interferometer for a Fourier transform spectrum analyzer, light from a light source is separated into two optical paths by a beam splitter, and the separated two light beams are then reflected by mirrors disposed in the optical paths and are combined by a beam splitter.

In such interferometer, a light source having a wide emission spectrum including infrared light is used; one separated light beam in the interferometer is reflected by a traveling mirror (moving mirror); the other separated light beam is reflected by a static mirror (fixed mirror); whereby an optical path difference is given between the separated two optical paths; and a frequency spectrum included is obtained by Fourier transforming an intensity profile (interferogram) from the light source obtained by receiving the combined light (interfering light).

By spectrum analyzing a transmitted light having passed through an analysis sample by using a Fourier transform spectrum analyzer, the spectrum absorbed in the analysis sample is obtained.

In recent years, there have been developed small sized MEMS mirrors that move while keeping parallelism, and by using such mirror as a moving mirror, a Fourier spectrometer has been made smaller.

In order to realize high wavelength resolution, a Fourier spectrometer is configured to have a long optical path difference between the two optical paths. In addition, in order to obtained high accuracy, the optical path difference is measured by laser light. In particular, a helium-neon laser having a long coherence length is used, and an interferometer having an optical path of the laser light is installed on an optical path different from an infrared light interferometer having an optical path of the infrared light (measurement light beam), and thus the optical path difference is measured from the intervals between the interference fringes observed in association with the movement of the moving mirror (see Patent Document 2, for example).

RELATED ART DOCUMENT

Patent Document

Patent Document 1: Japanese Laid-Open Patent Application Publication No. H 9-26358

Patent Document 2: Japanese Laid-Open Patent Application Publication No. H 7-243943

SUMMARY OF THE INVENTION

Object of the Invention

However, since in the above-described optical system for measuring the optical path difference of the interferometer, the optical path of the laser light and the optical path of the infrared light are located in different positions, the two optical paths do not have exactly the same length, whereby the optical path difference contains measurement error.

In addition, since a helium-neon laser is a gas laser, it cannot be easily made smaller. A helium-neon laser may be substituted by a semiconductor laser for downsizing, but the semiconductor laser has a large variation of wavelength with temperature, and the wavelength discontinuously changes like mode hopping, whereby it is difficult to highly precisely measure the optical path difference.

The present invention provides a small sized highly precise interferometer in which the difference between the optical path of the laser light and the optical path for the infrared light can be eliminated, whereby the optical path difference can be highly precisely measured, and also provides a Fourier transform spectrum analyzer using such interferometer.

Means for Solving the Object

The above-mentioned objects are achieved by the invention described below.

Item 1. An interferometer, comprising:
a first light source;
a second light source which is a laser light source;
a separation section to which light from the first light source and light from the second light source are incident and which is configured to separate the light from the first light source into a first transmitted light beam and a first reflected light beam, and configured to separates the light from the second light source into a second transmitted light beam and a second reflected light beam;
a first reflection section configured to reflect the first reflected light beam and the second reflected light beam;
a second reflection section configured to reflect the first transmitted light beam and the second transmitted light beam;
an actuator configured to move at least one of the first reflection section and the second reflection section;
a combining section configured to combine the first reflected light beam reflected by the first reflection section and the first transmitted light beam reflected by the second reflection section, and configured to combine the second reflected light beam reflected by the first reflection section and the second transmitted light beam reflected by the second reflection section;
a first light receiving section configured to receive interfering light including the first transmitted light beam and the first reflected light beam which are combined by the combining section; and
a second light receiving section configured to receive interfering light including the second transmitted light beam and the second reflected light beam which are combined by the combining section.

Item 2. The interferometer of item 1, wherein the second light source is a semiconductor laser, and the interferometer comprises a band narrowing element configured to allow a part of coherent light from the second light source to pass therethrough, configured to narrow a spectral line width, and configured to reflect and lead a part of the coherent light to the second light source.

Item 3. The interferometer of item 2, wherein the light from the first light source is a light having a wavelength equal to or longer than a wavelength of a visible range, and the coherent light from the second light source is a light which is in a visible range and has a wavelength shorter than the wavelength of the light from the first light source.

Item 4. The interferometer of item 1, wherein the reflection section which is either of the first reflection section or the second reflection section and is not moved by the actuator and the separation section are integrated one body in a form of prism.

Item 5. The interferometer of item 1, wherein an optical axis of the light from the first light source and an optical axis of the coherent light are matched along an optical path from the separation section to either of the first reflection section of the second reflection section which is not moved by the actuator, and along an optical path from the separation section to either of the first reflection section or the second reflection section which is moved by the actuator.

Item 6. The interferometer of item 1, comprising on an upstream of at least one of the first light source and the second light source:
an optical fiber having a joint; and
a collimating section configured to collimate light emitted from the optical fiber.

Item 7. A Fourier spectrometer, comprising:
an interferometer of item 1; and further
a control section,
wherein the control section is configured to measure movement of a reflection mirror based on an output of the second light receiving section, and configured to perform a Fourier analysis based on the measured result and an output of the first light receiving section.

Item 8. The Fourier spectrometer of item 7, comprising:
a monitor section which is provided on a downstream of the separation section, and is configured to monitor coherent light from the second light source by photoelectric converting the coherent light, assuming that the second light source is on an upstream; and
a control section configured to control a power for driving the second light source, wherein the control section controls the power for driving the second light source so as to make an output value of the monitor section constant.

Advantage of the Invention

Provided is a small sized highly precise interferometer in which the optical path difference can be highly precisely measured to eliminate measurement error, and also provided is a Fourier transform spectrum analyzer using such interferometer.

BEST MODE FOR CARRYING OUT THE INVENTION

Figure 1:
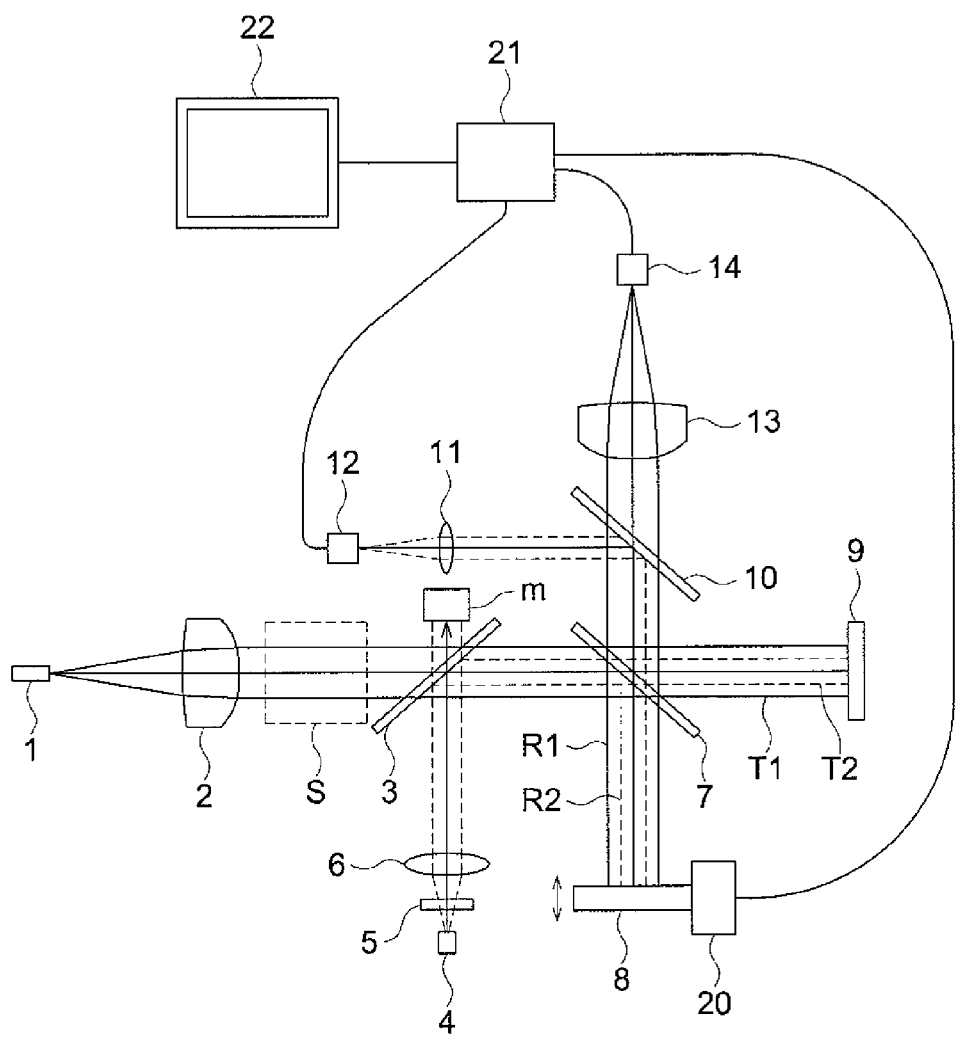
FIG. 1 is a schematic diagram showing a Fourier spectrometer A according to the embodiment.

An embodiment of the present invention is described with reference to the drawings without the present invention being limited to the embodiment to be described below. The elements assigned the same reference numerals are the same elements and descriptions thereof are omitted.

FIG. 1 is a schematic diagram showing a Fourier spectrometer A of the embodiment.

The Fourier spectrometer includes an interferometer L, a control section 21, and a display 22. The interferometer L is configured with a first light source 1, a collimator lens 2, a beam splitter 3, a second light source 4, a band narrowing element 5, a collimator lens 6, a beam splitter 7, a moving mirror 8, a fixed mirror 9, abeam splitter 10, a lens 11, a photo sensor 12, a lens 13, and a photo sensor 14.

In the interferometer L, the first light source 1 is a light source for emitting light having wavelengths of visible light and infrared light, and a common light source such as an incandescent lamp, a fluorescent lamp, or a white LED can be used. However, a light emitting surface is preferably small, and the light emitting surface may be limited by an opening or the like.

The collimator lens 2 is a lens for collimating the light from the first light source 1.

The second light source 4 is a light source for emitting coherent light, and in this embodiment a semiconductor laser is employed for miniaturization. The semiconductor laser preferably has a single vertical mode. If it is not a single mode, it is preferable to provide after an light emitting end of the second light source 4 with a wavelength filter that eliminates the modes other than the required vertical mode having the highest light intensity.

The band narrowing element 5 has functions to transmit a part of the coherent light emitted from the second light source 4, to narrow the spectral line width, and to reflect a part of the light. In particular, a diffraction grating is preferable such as VHG (volume holography) of a fiber grating. A part of the wavelength of the emitted coherent light becomes a reflected diffraction light in such diffraction grating, and it is led to an active layer of the semiconductor laser, and thus stimulated emission is caused, thereby locking the wavelength of the emitted light in the wavelength of the reflected diffraction light. Since the wavelength of the reflected diffraction light is made to have a width depending on the diffraction grating, the spectrum line of the wavelength of the emitted light of the semiconductor laser is fixed to a specific mode and the bandwidth can be narrowed.

The collimator lens 6 has a function to collimate the coherent light emitted from the band narrowing element 5.

The beam splitter 3 has a function to transmit the collimated light from the first light source 1, and to reflect the coherent light from the second light source 4, thereby matching the optical paths. The positions of the first light source 1 and the second light source 4 can be changed to each other with respect to the beam splitter 3.

The beam splitter 7 functions as a separation section which splits the light beam from the first light source 1 and through the beam splitter 3 into a first transmitted light beam T1 and a first reflected light beam R1, and splits the coherent light from the second light source 4 into a second transmitted light beam T2 and a second reflected light beam R2.

The moving mirror 8 (first reflection section) is disposed perpendicularly to the optical axes of the first reflected light beam R1 and the second reflected light beam R2 to reflect the light beams perpendicularly. The moving mirror 8 is configured to be moved in the optical axes of the first reflected light beam R1 and the second reflected light beam R2 by an actuator 20 and the control section 21 for controlling the actuator 20.

The fixed mirror 9 (second reflection section) is disposed perpendicularly to the optical axes of the first transmitted light beam T1 and the second transmitted light beam T2 to reflect the light beams.

The beam splitter 7 matches the optical paths of the light beams each reflected by each of the moving mirror 8 and the fixed mirror 9. In particular, the optical paths are matched so that the first transmitted light beam T1 and the first reflected light beam R1 interfere with each other, and the second transmitted light beam T2 and the second reflected light beam R2 interfere with each other.

In addition, since the optical paths of the first transmitted light beam T1 and the second transmitted light beam T2 are matched and the optical paths of the first reflected light beam R1 and the second reflected light beam R2 are matched, the affection to the interference property is reduced even if the position or the angle of the moving mirror 8 or the fixed mirror 9 varies.

The beam splitter 10 has wavelength selective properties to distinguish between the wavelengths of the light from the first light source and the wavelength of the coherent light from the second light source 4. In particular, it reflects one of the light from the first light source and the coherent light from the second light source 4, and transmits the other.

The beam splitter 10 functions as a combining section which combines the first transmitted light beam T1 reflected by the moving mirror 8 and the first reflected light beam R1 reflected by the fixed mirror 9, and combines the second reflected light beam R2 reflected by the moving mirror 8 and the second transmitted light beam T2 reflected by the fixed mirror 9. The beam splitter 10 is a dielectric multilayer mirror, for example. In FIG. 1, it reflects the light from the first light source and transmits the coherent light from the second light source 4, but the situation of reflection and transmission may be reversed.

Since the second transmitted light beam T2 and the second reflected light beam R2 are combined by the beam splitter 7 so as to have the same wave front, the second transmitted light beam T2 and the second reflected light beam R2 both reflected by the beam splitter 10 are combined, having the same wave front.

The lens 11 has a function to condensing on the photo sensor 12 the second transmitted light beam T2 and the second reflected light beam R2 both reflected by the beam splitter 10.

The photo sensor 12 is a photo diode, for example, and has a function to convert the received light in to an electric signal.

The lens 13 has a function to condense, on the photo sensor 14, the first transmitted light beam T1 and the first reflected light beam R1 that are combined by the beam splitter 7 to have the same wave front.

The photo sensor 14 is a photo diode, for example, and has a function to convert the received light into an electric signal.

The beam splitter 7 preferably is a half mirror in which each of the transmittance and the reflectance are the same for both the light from the first light source 1 and the coherent light. The beam splitter 10 preferably transmits almost all the light from the first light source 1 and reflects almost all the coherent light Differentiating the wavelength of a light source makes it possible to differentiate the reflectance depending on a light source as described above. In this embodiment, since the wavelengths of the light from the first light source range from the white region to the infrared region, the wavelength of the coherent light of the second light source 4 is set shorter than all the wavelengths of the light from the first light source 1.

When a laser light source is used as the second light source 4, possible returning light may enter the resonator of the laser to cause induced emission, thereby making the oscillation unstable; therefore, it is preferable that the returning light is weak. In particular, a polarizing plate and a ¼ wavelength plate may be provided behind the collimator lens 6, with the axis of the ¼ wavelength plate inclined at 45 degrees with respect to the axis of the polarizing plate. The laser light emitted from the polarizing plate is linearly polarized and it is converted into a circularly polarized light by the ¼ wavelength plate; the returning light is converted by the ¼ wavelength plate into a linearly polarized light having a polarization direction perpendicular to the axis of the polarizing plate and is cut off by the polarizing plate; whereby the returning light does not return to the second light source 4. Instead of this manner, the moving mirror 8 and the fixed mirror 9 may be disposed with their normal lines inclined from the direction of the incoming coherent light to reduce the returning light.

In addition, it is preferable that the reflectance of the moving mirror 8 with respect to the first reflected light beam R1 and the reflectance of the fixed mirror 9 with respect to the first transmitted light beam T1 are substantially the same.

It is also preferable that the reflectance of the moving mirror 8 with respect to the second reflected light beam R2 and the reflectance of the fixed mirror 9 with respect to the second transmitted light beam T2 are substantially the same.

The actuator 20 moves the moving mirror 8 along the incident direction of light. The control section 21 obtains outputs of the photo sensors 12 and 13, controls the actuator 20, performs calculations for Fourier spectroscopy, and displays the results of the calculations on the display 22.

An operation of the Fourier spectrometer A according to this embodiment is described. The Fourier spectrometer A measures the spectrum of the light entering the photo sensor 14. As shown in the layout diagram of FIG. 1, the light from the first light source 1 is received by the photo sensor 14, and the spectrum of the light from the first light source 1 is thus measured. If an analysis sample is located at the position indicated by the character S in FIG. 1, the spectrum of the light passing through the analysis sample can be measured.

The light from the first light source 1 is split by the beam splitter 7 into the first transmitted light beam T1 and the first reflected light beam R1, and the light beams are combined so as to have the same wave front to become an interfering light entering the photo sensor 14.

In association with the movement of the moving mirror 8, the phase difference between the first transmitted light beam T1 and the first reflected light beam R1 varies. Thus, it is controlled which direction the first reflected light beam R1 reflected by the moving mirror 8 and the first transmitted light beam T1 reflected by the fixed mirror are directed to the beam splitter 10 or the first light source 1 after they are combined by the beam splitter 7. For example, by moving the moving mirror 8 at a predetermined speed and by performing a Fourier transform, in a calculation section such as a CPU equipped in the control section 21, on the light intensity of the interfering light coming from the first light source 1 and entering the photo sensor 14, the spectrum of the light entering the photo sensor 14 can be calculated.

Figure 2:
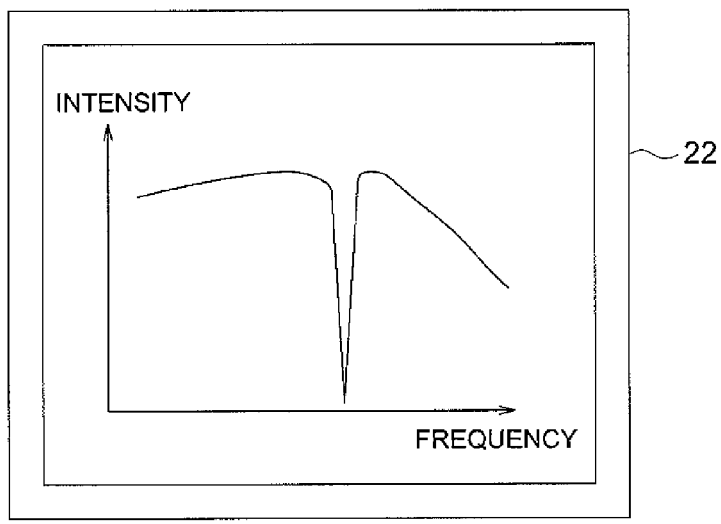
FIG. 2 is a general graph of a spectrum of incident light entering a photo sensor 14.

FIG. 2 is a general graph of the spectrum of the light entering the photo sensor 14. The calculation result of the intensity with respect to frequency is displayed on the display 22. The frequency of the light absorbed in the analysis sample is observed.

In the Fourier spectroscopy analysis, it is important to calculate the optical path difference by measuring the length of an optical path (also referred to as "optical path length") along which the first transmitted light beam T1 passes through the beam splitter 7, is reflected by the fixed mirror 9, and returns to the beam splitter 7, and by measuring the length of an optical path (also referred to as "optical path length 2") along which the first reflected light beam R1 is reflected by the beam splitter 7, is reflected by the moving mirror 8, and returns to the beam splitter 7. In this embodiment, the measurement of the optical path difference between the optical path length 1 and the optical path length 2 for the light from the first light source 1 is substituted by the measurement of the optical path difference between the optical path length 1 and the optical path length 2 for the coherent light.

Figure 3:
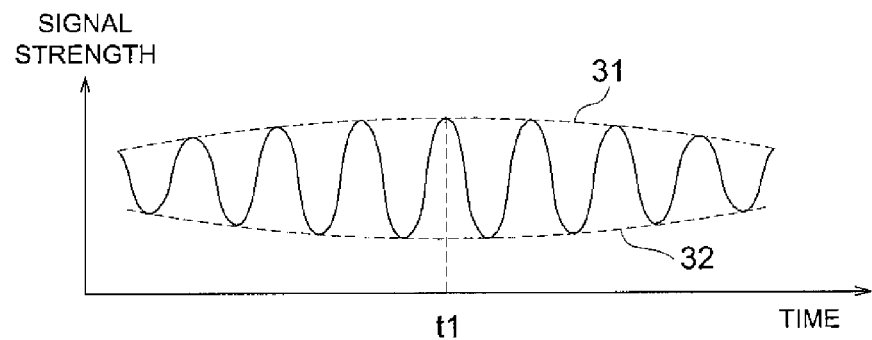
FIG. 3 is a general graph of an output of a photo sensor with the horizontal axis representing a measurement time and the vertical axis representing a light intensity.

FIG. 3 is a general graph of the output value of the photo sensor 12, where the horizontal axis represents measurement time and the vertical axis represents the light intensity. It is assumed that the moving mirror 8 is moved at a constant velocity.

In the case that the moving mirror 8 is moved at a constant velocity, the intensity of the output of the photo sensor 12 has a sinusoidal waveform, and the ratio (visibility) between the top and the bottom of the sine wave is at its maximum when the optical path length 1 and the optical path length 2 is the same. The position of the moving mirror 8 corresponding to time t1 of the graph represents the position at which the optical path length 1 and the optical path length 2 are the same. Time t1 is the time when the difference between the envelope 31 of the peaks and the envelop 32 of the valleys is at its maximum.

In more particular, the control section 21 moves the moving mirror 8 in a predetermined range, and in the mean time the control section 21 receives the intensity of the light received by the photo sensor, in other words, the signal strength of the output of the photo sensor, and stores the signal strength in a not shown memory such as RAM in relation to the time for which the moving mirror 8 has been moved.

Then, the control section 21 calculates the optical path difference from the obtained data of time and signal strength, by a known method. Since a Fourier spectroscopy analysis is performed after that, it is accurately performed.

In addition, when the coherence length of the coherent light is long, the interference property is easily obtained even if the optical path difference between the optical path length 1 and the optical path length 2 is large; therefore a long coherence length is preferable. The coherence length is generally expressed by $\lambda^2/\Delta\lambda$, assuming the wavelength to be $\lambda$ and the width of the wavelength to be $\Delta\lambda$. Therefore, a light source having small $\Delta\lambda$ is preferable. In particular, in the case of a red semiconductor laser being used, the coherence length is some hundred microns; in the case of a so-called stabilized semiconductor laser or a He—Ne laser being used, the coherence length is some hundred millimeters; and in the case of a so-called stabilized He—Ne laser being used, the coherence length is some ten meters.

Figure 4:
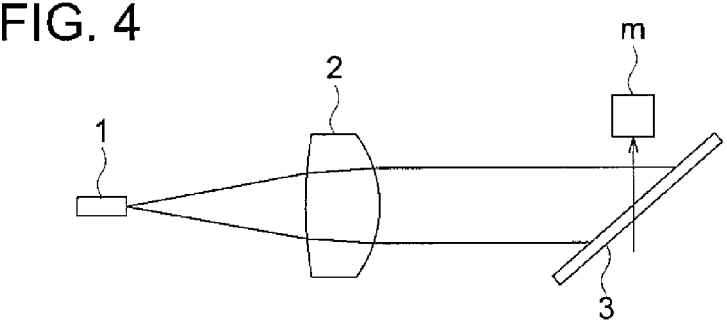
FIG. 4 is a layout diagram showing a layout of a photo sensor m for monitoring and photoelectric converting the light intensity of coherent light of a second light source 4.

In addition, it is preferable that the light intensity of the coherent light from the second light source 4 is monitored and fed back to the second light source 4 so that the light intensity is kept constant. The photo sensor m is preferably positioned upstream of the beam splitter 7 which is a separation section for separating the coherent light. The output of the photo sensor m is sent to the control section 21, and the control section 21 feeds it back to the power for driving the second light source 4 so as to make the output of the photo sensor m constant. FIG. 4 is a layout diagram for showing the arrangement of the photo sensor m for monitoring and photoelectric converting the light intensity of the coherent light of the second light source 4 as well. In this arrangement, the beam splitter 3 is configured such that the beam splitter 3 reflects a part of the coherent light from the second light source 4. For example, in the case that the beam splitter 3 has a dielectric multilayer structure, the film configuration of the dielectric multilayer is designed and formed so as to reflect a part of the coherent light from the second light source 4. The above-mentioned measure is not taken if the wavelength largely varies depending on the drive current.

Figure 5:
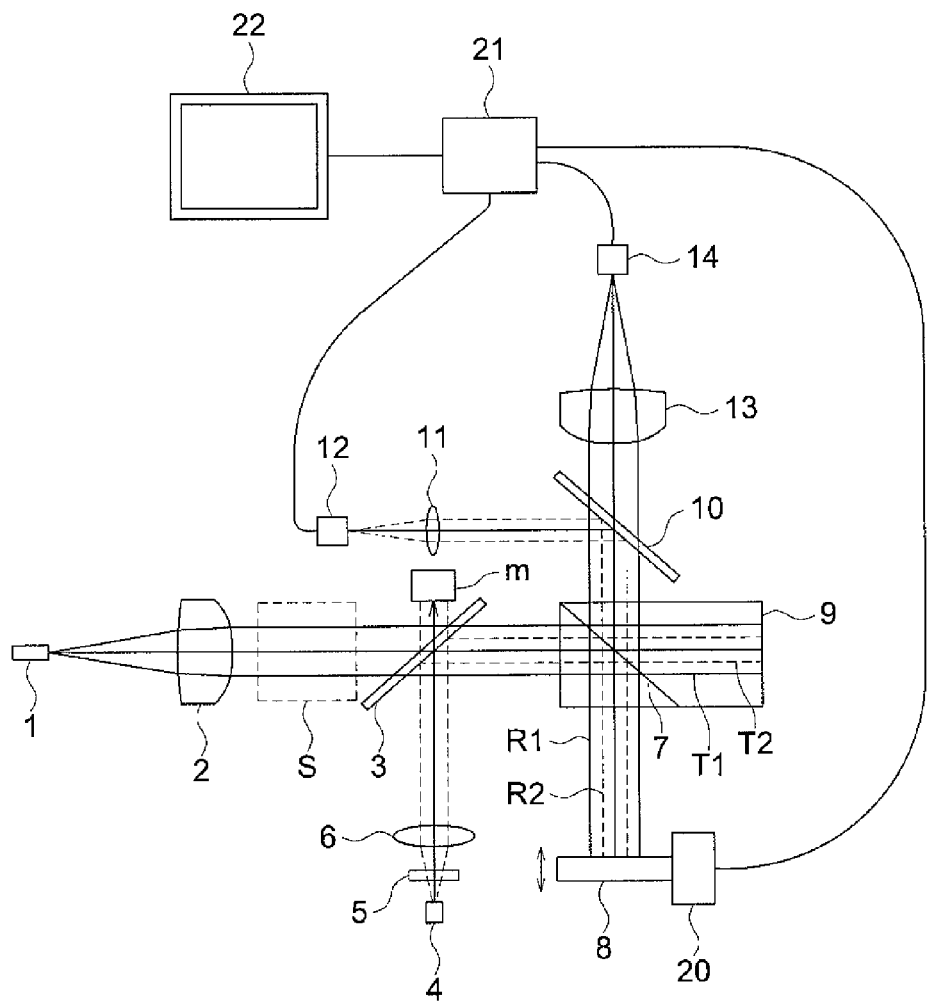
FIG. 5 is a schematic diagram showing the Fourier spectrometer A using a beam splitter 7 and a fixed mirror 9, which are integrated in one body in a form of prism.

In addition, it is preferable that the beam splitter 7 and the fixed mirror 9 are collectively integrated in one body in a form of prism shape as shown in FIG. 5. FIG. 5 is a schematic diagram of the Fourier spectrometer A employing the beam splitter 7 and the fixed mirror 9 that are in one body in a form of prism.

By forming them in one body in a form of prism, the air layer between the beam splitter 7 and the fixed mirror 9 is eliminated; thus the possible effect to the properties of an interferometer due to the air current can be eliminated, and the change in the optical path length caused by the variation in position of the fixed mirror 9 caused by external vibration. Thus, the properties of an interferometer can be stabilized, and stable Fourier transform spectrum analyzers can be provided.

Figure 6:
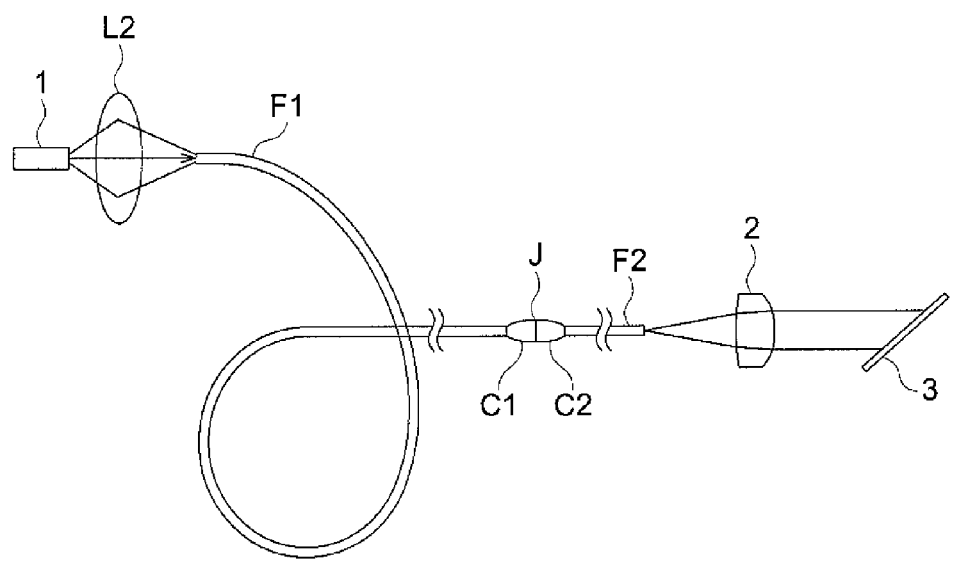
FIG. 6 is a schematic diagram showing an optical fiber light source.

As the first light source 1 or the second light source 4, an optical fiber light source may be used. FIG. 6 shows an embodiment using an optical fiber light source as the first light source 1. FIG. 6 is a schematic diagram of an optical fiber light source. The optical fiber light source is made up of a first light source 1 and a lens L2 in addition to an optical fiber F and a joint J. The optical fiber F is configured with an optical fiber F1 having a connector C1 and an optical fiber F2 having a connector C2. The connectors C1 and C2 are connected to be a joint J.

As in the above arrangement, since regarding the first light source 1 and the second light source 4, the components on the light source side of the joint J can be replaced; an arbitrary light source can be employed. If an arbitrary light source is employed as the light source 1, a Fourier transform spectrum analyzer for the light source having an arbitrarily spectrum needed can be provided.

As described above, according to the present invention, provided is an interferometer, comprising: a first light source; a second light source which is a laser light source; a separation section to which light from the first light source and light from the second light source are incident and which is configured to separate the light from the first light source into a first transmitted light beam and a first reflected light beam, and configured to separates the light from the second light source into a second transmitted light beam and a second reflected light beam; a first reflection section configured to reflect the first reflected light beam and the second reflected light beam; a second reflection section configured to reflect the first transmitted light beam and the second transmitted light beam; an actuator configured to move at least one of the first reflection section and the second reflection section; a combining section configured to combine the first reflected light beam reflected by the first reflection section and the first transmitted light beam reflected by the second reflection section, and configured to combine the second reflected light beam reflected by the first reflection section and the second transmitted light beam reflected by the second reflection section; a first light receiving section configured to receive interfering light including the first transmitted light beam and the first reflected light beam which are combined by the combining section; and a second light receiving section configured to receive interfering light including the second transmitted light beam and the second reflected light beam which are combined by the combining section, wherein the interferometer can eliminate direction error by highly precisely determining an optical path difference.

In addition, according to the present invention, the position of the moving mirror 8 is highly precisely measured in an arrangement in which the coherent light from the second light source 4 which is a laser light source is led into a band narrowing element, and reflected light from the band narrowing element is made to return to the second light source 4 to lock the oscillation wavelength of the second light source. Thus, the optical path length 1 and the optical path length 2 are highly precisely matched to eliminate the optical path difference between the two optical paths, and a small and highly precise interferometer can thus be provided.

In addition, according to the present invention, since the light from the first light source 1 has wavelengths equal to or longer than the wavelength of a visible range, and the coherent light from the second light source is in a visible range and has a wavelength shorter than the wavelengths of the light from the first light source, there can be provided an interferometer which uses light in a wide wavelength range including white light and infrared light and in which the coherent light from the second light source 4 and the light from the first light source 1 are almost perfectly separated by using the beam splitter 10 having a wavelength selectivity property.

In addition, according to the present invention, since the separation section and the fixed mirror are configured in one body in a form of prism, there can be provided an interferometer in which the optical path length 1 and the optical path length 2 are highly precisely matched.

In addition, according to the present invention, the optical axis of the light from the first light source 1 and the optical axis of the coherent light are matched to each other on the optical path from the separation section to the fixed mirror and on the optical path from the separation section to the moving mirror. Therefore, even if there is change in position or angle with respect to the moving mirror 8 or the fixed mirror 9, there can be provided an interferometer in which the effect to an interference property is reduced and the optical path length 1 and the optical path length 2 are highly precisely matched.

In addition, according to the present invention, since an optical fiber having a joint and a collimating section for collimating the emitted light from the optical fiber are provided upstream area in at least one of the first light source 1 and the second light source; when the first light source, for example, is replaced with a light source having an arbitrary spectrum, there can be provided an interferometer having the arbitrarily spectrum needed.

In addition, according to the present invention, since the interferometer includes the above-described interferometer and further a control section, which measures the movement of the reflection mirror on the basis of the output of the second light receiving section and performs a Fourier analysis on the basis of the output of the first light receiving section; there can be provided a small and highly precise Fourier spectrometer.

In addition, according to the present invention, assuming the second light source side to be an upstream side, the interferometer includes: a monitor section for monitoring by photoelectric converting the coherent light from the second light source 4 in the downstream of the separation section; and a control section for controlling the power for driving the second light source 4, wherein since the control section controls the power for driving the second light source 4 so as to make the output of the monitor section constant. Thus, even the waveform of the interference fringe can be measured with high precision, and the optical path difference can be precisely measured in higher resolution by interpolating the inside of the contrast, whereby a more highly precise Fourier spectrometer can be provided.

DESCRIPTION OF THE NUMERALS

2, 6: Collimator lens
3,7,10: Beam splitter
4: Second light source
5: Band narrowing element
8: Moving mirror
9: Fixed mirror
11, 13: Lens
12, 14: Photo sensor
21: Control section

The invention claimed is:
1. An interferometer, comprising:
a first light source;
a second light source configured to include a semiconductor light source and configured to emit coherent light;
a band narrowing element configured to allow a part of the coherent light from the second light source to pass therethrough, configured to narrow a spectral line width of a part of the coherent light, and configured to reflect and lead the part of the coherent light in which the spectral line width has been narrowed to the second light source;
a separation section to which light from the first light source and the coherent light from the second light source are incident and which is configured to separate the light from the first light source into a first transmitted light beam and a first reflected light beam, and configured to separate the coherent light from the second light source into a second transmitted light beam and a second reflected light beam;
a first reflection section configured to reflect the first reflected light beam and the second reflected light beam both entering the first reflection section, a part of the second reflected light beam reflected by the first reflection section being reflected by the separation section and returning to the second light source;
a second reflection section configured to reflect the first transmitted light beam and the second transmitted light beam both entering the second reflection section, a part of the second transmitted light beam reflected by the second reflection section passing through the separation section and returning to the second light source;
an actuator configured to move the first reflection section;
a combining section configured to combine the first reflected light beam reflected by the first reflection section and the first transmitted light beam reflected by the second reflection section, and configured to combine the second reflected light beam reflected by the first reflection section and the second transmitted light beam reflected by the second reflection section;

a first light receiving section configured to receive interfering light including the first transmitted light beam and the first reflected light beam which are combined by the combining section; and a second light receiving section configured to receive interfering light including the second transmitted light beam and the second reflected light beam which are combined by the combining section;

wherein at least one of the first reflection section and the second reflection section is disposed such that a normal line of the first reflection section is inclined from a direction of the second reflected light beam entering the first reflection section so that an amount of the second reflected light beam returning to the second light source is reduced or such that a normal line of the second reflection section is inclined from a direction of the second transmitted light beam entering the second reflection section so that an amount of the second transmitted light returning to the second light source is reduced.

2. The interferometer of claim 1, wherein the coherent light from the second light source has a wavelength in a visible range, and the light from the first light source has a wavelength spectrum including only wavelengths longer than the wavelength of the coherent light from the second light source.

3. The interferometer of claim 1, wherein the second reflection section and the separation section are integrated in one body in a form of prism.

4. The interferometer of claim 1, wherein an optical axis of the light from the first light source and an optical axis of the coherent light from the second light source are matched along an optical path from the separation section to the first reflection section, and along an optical path from the separation section to the second reflection section.

5. The interferometer of claim 1, comprising, between the first light source and the separation section, in order from the first light source:
a joint;
an optical fiber configured to lead the light from the first light source; and
a collimating section configured to collimate light emitted from the optical fiber,
wherein the first light source is coupled to the optical fiber through the joint.

6. A Fourier spectrometer, comprising:
an interferometer of claim 1; and
a control section configured to measure movement of a reflection mirror based on an output of the second light receiving section, and configured to perform a Fourier analysis based on the measured result and an output of the first light receiving section.

7. The Fourier spectrometer of claim 6, comprising:
a monitor section which is provided on a side of the second light source with respect to the separation section, and is configured to photoelectric convert the coherent light from the second light source,
wherein the control section controls the power for driving the second light source based on an output value of the monitor section so as to make the output value constant.

8. An interferometer, comprising:
a first light source;
a second light source configured to include a semiconductor light source and configured to emit coherent light;
a band narrowing element configured to allow a part of the coherent light from the second light source to pass therethrough, configured to narrow a spectral line width of a part of the coherent light, and configured to reflect and lead the part of the coherent light in which the spectral line width has been narrowed to the second light source;
a separation section to which light from the first light source and the coherent light from the second light source are incident and which is configured to separate the light from the first light source into a first transmitted light beam and a first reflected light beam, and configured to separates the coherent light from the second light source into a second transmitted light beam and a second reflected light beam;
a first reflection section configured to reflect the first reflected light beam and the second reflected light beam both entering the first reflection section, a part of the second reflected light beam reflected by the first reflection section being reflected by the separation section and returning to the second light source;
a second reflection section configured to reflect the first transmitted light beam and the second transmitted light beam both entering the second reflection section, a part of the second transmitted light beam reflected by the second reflection section passing through the separation section and returning to the second light source;
an actuator configured to move at least one of the first reflection section and the second reflection section;
a combining section configured to combine the first reflected light beam reflected by the first reflection section and the first transmitted light beam reflected by the second reflection section, and configured to combine the second reflected light beam reflected by the first reflection section and the second transmitted light beam reflected by the second reflection section;
a first light receiving section configured to receive interfering light including the first transmitted light beam and the first reflected light beam which are combined by the combining section; and
a second light receiving section configured to receive interfering light including the second transmitted light beam and the second reflected light beam which are combined by the combining section;
wherein at least one of the first reflection section and the second reflection section is disposed such that a normal line of the first reflection section is inclined from a direction of the second reflected light beam entering the first reflection section so that an amount of the second reflected light beam returning to the second light source is reduced or such that a normal line of the second reflection section is inclined from a direction of the second transmitted light beam entering the second reflection section so that an amount of the second transmitted light returning to the second light source is reduced.

* * * * *